United States Patent [19]

Rekers et al.

[11] 4,276,399
[45] Jun. 30, 1981

[54] SUPPORTED CATALYST FROM CHROMIUM FOR OLEFIN POLYMERIZATION

[75] Inventors: Louis J. Rekers, Wyoming; Anthony N. Speca, Cincinnati, both of Ohio

[73] Assignee: National Petro Chemicals Corp., New York, NY

[21] Appl. No.: 25,418

[22] Filed: Mar. 30, 1979

Related U.S. Application Data

[60] Division of Ser. No. 961,574, Nov. 17, 1978, Pat. No. 4,189,402, which is a continuation of Ser. No. 800,585, May 25, 1977, abandoned.

[51] Int. Cl.$^3$ .................................................. C08F 4/24
[52] U.S. Cl. ................................... 526/106; 526/101; 526/103; 526/352
[58] Field of Search ......................................... 526/106

[56] References Cited

U.S. PATENT DOCUMENTS

| | | | |
|---|---|---|---|
| 3,232,913 | 2/1966 | Weynbergh | 526/106 |
| 4,110,522 | 8/1978 | Frielingsdorf | 526/105 |
| 4,152,503 | 5/1979 | Short | 526/106 |

*Primary Examiner*—C. A. Henderson
*Attorney, Agent, or Firm*—Kenneth D. Tremain

[57] ABSTRACT

Polymerization of 1-olefins is conducted with a supported catalyst consisting essentially of a polymeric hydrocarbon aluminate comprising at least one

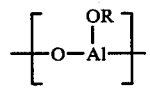

unit.

6 Claims, No Drawings

SUPPORTED CATALYST FROM CHROMIUM FOR OLEFIN POLYMERIZATION

This is a division of application Ser. No. 961,574, filed Nov. 17, 1978 now U.S. Pat. No. 4,189,402 which is a continuation of Ser. No. 800,585 filed May 25, 1977, now abandoned.

FIELD OF THE INVENTION

This invention relates to the production of polyolefin resins and, more particularly, to a catalytic method for preparing polyethylene resins employing supported heat activated chromium containing catalysts comprising polymeric hydrocarbon aluminates.

BACKGROUND OF THE INVENTION

Molded articles, and particularly blow molded structures such as bottles are commonly formed from polymers of 1-olefins such as polyethylene. It is important to the commercial utilization of a given polymer system that the converted product such as a bottle exhibit an optimized balance of properties, including for example, acceptable stress crack resistance and flexural stiffness. In addition, and in a contributing sense, it is necessary that the polymer exhibit suitable processability, i.e., satisfactory rheological behavior under flow and formation during fabrication. Although the viscoelastic behavior of polymer melts has been the subject of considerable study, it has not proven possible to translate performance during fabrication to end use articles in such manner as to selectively determine polymerization and particularly catalyst requirements. Moreover, as in any case catalyst performance must also be measured in terms of efficiency or productivity and stability over a sensible life.

The use of chromium compounds in the polymerization of olefins is well-known. U.S. Pat. Nos. 2,825,721 and 2,951,816 teach the use of $CrO_3$ supported on an inorganic material such as silica, alumina or combinations of silica and alumina and activated by heating at elevated temperatures to polymerize olefins. When these catalyst systems are used in various polymerization processes such as the well-known particleform process, the resins produced, while useful in many applications, are unsatisfactory for others because of a deficiency in certain properties such as melt index.

Improved chromium based supported catalyst are known, particularly those disclosed and claimed in U.S. Pat. No. 3,984,351. Preferably, such catalysts employ an aluminum dopant i.e., the porous support is treated with an aluminum compound reactive with surface hydroxyl groups on the support, prior to heat activation, as disclosed in U.S. Pat. No. 3,985,676.

It has now been discovered that the aluminum compounds react with residual system water even at low levels, interfering with reproducibility in use in terms of resin properties. While this problem can be resolved by careful control of residual water level, as disclosed in copending and commonly assigned Ser. No. 800,586 of Rekers et al. filed concurrently herewith on May 25, 1977, reduction in moisture levels below about 0.4 weight percent in supports such as silica gel is difficult or expensive, and simpler and more direct methods would be of benefit for control of catalyst characteristics.

Accordingly, it is desired to identify aluminum compounds active to improve catalyst performance but essentially resistant to hydrolysis under preparative conditions, while preserving reactivity with the surface hydroxyl groups of the support materials.

Manyik et al. in U.S. Pat. Nos. 3,231,550 and 3,242,099 describe poly(hydrocarbylaluminum oxides) produced by the reaction of water with an organo hydrocarbylaluminum compound, which are in turn reacted with transition metal e.g., chromium compounds and used as olefin polymerization catalysts.

Rinse, and Rinse et al. in U.S. Pat. Nos. 3,054,816 and 3,056,725 show the preparation of polymeric aluminum oxide hydroxides mentioned as catalysts for dehydration and dehydrogenation of petroleum compounds.

Modifications in silica gel for catalytic activity are shown in Burwell, Chemtech, pp. 370–377 (1974) and Peri, J. Cat. 41, pp. 227–239 (1976). None of these prior art disclosures refer to a supported, polymeric hydrocarbon aluminate catalyst, or its use, as in conjunction with a chromium compound, in the polymerization of olefins.

BRIEF DESCRIPTION OF THE INVENTION

It has been discovered that level and type of aluminum values deposited upon a supported catalyst critically controls its characteristics, and may be employed in a chromium catalyst system as a direct means to achieve selective resin production in a controlled 1-olefin.

In accordance with this invention there is produced a catalyst comprising a porous support coated with a polymeric hydrocarbon aluminate. The aluminum treated supports may be activated by heating in a non-reducing e.g., oxygen-containing atmosphere at a temperature above about 200° F. up to the decomposition temperature of the support material, and utilized directly as a hydrogenation or cracking catalyst e.g., in the isomerization of hexane, with excellent activity, selectivity, stability and attrition resistance. Thus, such materials may be used as supports with other catalytic promoters in a variety of catalysed reactions or employed directly for isomerization, reforming, cracking, polymerization, alkylation, dealkylation, hydrogenation, dehydrogenation or hydrocracking reactions.

Preferably, the support is coated with the polymeric hydrocarbon aluminate and also treated with a catalytic element being a compound of a metal selected from the group consisting of chromium, cobalt, nickel, vanadium, molybdenum and tungsten, or admixtures thereof, ordinarily as the oxides, and most preferably a chromium containing compound, especially a chromium oxide, or the organophosphoryl chromium reaction product of U.S. Pat. No. 3,985,676 aforementioned.

In the most preferred embodiment of the present invention an organophosphoryl chromium reaction product is deposited upon a high surface area silica gel with the polymeric hydrocarbon aluminate and the catalyst intermediate so produced is heat activated for use.

DETAILED DESCRIPTION OF THE INVENTION

The inorganic support materials useful in the present invention include those normally employed in supported chromium catalysts used in olefin polymerizations such as those discussed in U.S. Pat. No. 2,825,721. Typically, these support materials are inorganic oxides of silica, alumina, silica-alumina mixtures, thoria, zirconia and comparable oxides which are porous, have a medium surface area, and have surface hydroxyl groups. Preferred support materials are silica xerogels or xerogels containing silica as the major constituent. Especially preferred are the silica xerogels described in U.S. Pat. Nos. 3,652,214-6 which silica xerogels have a surface area in the range of 200 to 500 m²/g. and a pore volume greater than about 2.0 cc/g. a major portion of the pore volume being provided by pores having diameters in the range of 300 to 600 Å.

Such supports may be provided with a regulated water content up to 15 to 25 weight percent based upon the support, preferably 0.25 to 6.0 weight percent as described in Rekers et al. application Ser. No. 800,586 aforementioned, but it is a feature of this invention that catalyst performance is independent of ordinary moisture variations.

The polymeric hydrocarbon aluminates comprise at least one >AlOAl< unit preferably bonded to functionalities reactive with the surface hydroxyl groups of the support, usually comprising at least one —OR group wherein R is a hydrocarbon radical, having up to about 8 carbon atoms. The simplest form is constituted by the dimer of an aluminum alkoxide, having the corresponding formula: (RO)₂Al—O—Al(OR)₂ but will range through the cyclic trimer:

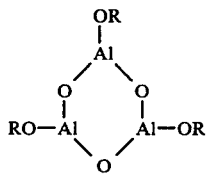

to longer chain structures, wherein the repeating unit

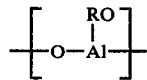

may range up to 5 or 6 or higher in number.

Mixtures of the aforesaid materials may of course be used, reflected in non-integral multiples, but the ability to selectively provide discrete aluminum-containing structures is considered to be an advantage of the invention.

In general, the structures may be represented by the formula:

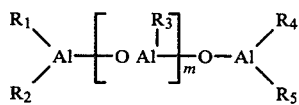

or

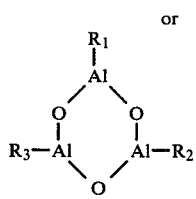

wherein m is a value from 1 to 8 or more, and $R_1$-$R_5$ comprise one or more functional groups reactive with the surface hydroxyl groups of the support which may be the same or different. The $R_1$-$R_5$ substituents may be individually selected from the group consisting of alkyl such as methyl, ethyl, propyl, isopropyl, n-butyl, isobutyl, hexyl, octyl etc.; aralkyl such as benzyl; aryl or alkaryl such as phenyl, tolyl, xylyl; cycloalkyl such as cyclohexyl; alkoxy such as methoxy, ethoxy, isopropoxy, butoxy, isobutoxy, etc. aryloxy such as phenoxy, benzyloxy, etc. and ester such as acetoxy, benzoxy, etc; or halogen such as chlorine or bromine.

The compounds of choice comprise a minor proportion of carbon-to-aluminum bonds, and are essentially free of hydroxyl functionality. The —OR substituent having up to about 10 carbon atoms has been found most convenient to employ in the sense of ease of preparation and handling of the resulting polymeric hydrocarbon aluminates and is accordingly preferred. Such compounds may be readily prepared as from the corresponding alkoxides for example as disclosed in U.S. Pat. Nos. 3,054,816 and 3,056,725 aforementioned, and incorporated herein by reference. Most preferably, $R_1$-$R_5$ comprise —OR substituents, generally the same such unit e.g., sec-butoxide.

Selection of the aluminum species permits reliable control over resin properties in use, as for example in providing desired rheological characteristics e.g., specific molecular weight and molecular weight distribution.

Without wishing to be bound by an essentially hypothetical elucidation, it is believed that the discrete structural isomers formed react with the surface hydroxyl groups on the porous support in a unique manner for each stereoisomeric configuration, leading to precisely distinct catalyst species upon heat activation, the differentiated catalysts reliably controlling resin properties in the polymerization of 1-olefins.

For the preparation of the preferred polymerization catalysts, the support is treated with a chromium-containing compound, before heat activation.

The chromium containing compounds useful in the present invention comprise any chromium containing compound capable of reacting with the surface hydroxyl groups of an inorganic support. Examples of such compounds include chromium trioxide, chromate esters such as the hindered di-tertiary polyalicyclic chromate esters, silyl chromate esters and phosphorus containing chromate esters disclosed in U.S. Pat. Nos. 3,642,749; and 3,704,287, and organophosphoryl chromium compounds such as those disclosed in U.S. Pat. No. 3,985,676 (incorporated herein by reference) which comprise the reaction product of chromium trioxide with an organophosphorus compound having the formula

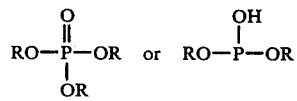

The novel catalyst of the present invention may be prepared by depositing the chromium containing compound and the aluminum compound on the inorganic support in any suitable manner such as by vapor coating or by impregnating the support with solutions of the chromium containing compound and the aluminum compound in a suitable inert solvent which is normally an anhydrous organic solvent. Such organic solvents include aliphatic, cycloalkyl, and alkylaryl hydrocarbons and their halogenated derivatives. A preferred organic solvent is dichloromethane. The chromium and aluminum compound may be applied together, or individually in any order. In applicants' usual method of catalyst preparation, the support is impregnated first with the chromium containing compound and then the aluminum compound. Most preferred for optimum reproducibility is anhydrous organic solvent application by impregnation, employing about 1 to 2 pore volumes of a solvent such as methylene chloride.

When an organophosphoryl chromium compound of the type disclosed in the aforesaid U.S. Pat. No. 3,985,676 is utilized in the practice of the present invention, it is preferred to employ the particular catalyst preparation techniques described in that application, the disclosure of which is incorporated by reference herein. In such instance the organoaluminum compound may be applied to the catalyst support under conditions similar to those utilized for deposition of the organophosphoryl chromium compound.

The most effective catalysts have been found to be those containing the chromium compound in an amount such that the amount of Cr by weight based on the weight of the support is from about 0.25 to 2.5% and preferably is from about 0.5 to 1.25%, although amounts outside of these ranges still yield operable catalysts. The aluminum compound should be added in sufficient amounts to provide from about 0.1 to 10% of aluminum by weight based on the weight of the support and preferably from about 0.5 to 5.5% although other amounts outside of these ranges can be used to prepare operable catalysts. Time of reaction or interaction of the aluminum and chromium compounds with the support does not appear to be critical, and deposition is normally effected under ambient conditions, as in a conventional blender-coater apparatus. The polymeric aluminum compounds are essentially resistant to hydrolysis under conditions in use, i.e., as applied to the porous support, usually comprising adsorbed water in amounts typically ranging from 0.4 to 25 percent by weight (with which the polymeric aluminum compounds may be in contact for 24 hours or more before heat activation), polymerizations utilizing heat activated chromium-containing catalyst show substantially invariant average resin properties for equivalent runs.

After the chromium containing compound and the aluminum compound have been deposited on the inorganic support, the support is heated in a non-reducing atmosphere, preferably in an oxygen containing atmosphere, at a temperature above about 200° F. up to the decomposition temperature of the support. Typically, the supported compositions are heated at a temperature of from 800° F. to 2000° F. The heating time may vary, for example, depending on the temperatures used, from ½ hour or less to 50 hours or more. Normally, the heating is carried out over a period of 2 to 12 hours. The nonreducing atmosphere which is preferably air or other oxygen containing gas should be dry and preferably should be dehumidified down to a few parts per million (ppm) of water to obtain maximum catalyst activity. Typically, air used in the procedure described in this application is dried to less than 2-3 ppm of water.

In accordance with the disclosure of U.S. Pat. No. 4,100,104 issued July 11, 1978 incorporated herein by reference, the catalyst may be prepared by separately activating the catalyst after the addition of each separate component.

The catalysts prepared in accordance with the invention may be employed directly in the polymerization of olefins, or may be blended in all proportions with other supported chromium containing catalysts to assist in the control of performance in use.

The heat-treated supported chromium and aluminum compounds of the present invention may be used in combination with metallic and/or non-metallic reducing agents to provide novel catalyst systems for the polymerization of olefins. Examples of metallic reducing agents include trialkyl aluminums, such as triethyl aluminum, triisobutyl aluminum, alkyl aluminum halides, alkyl aluminum alkoxides, dialkyl zinc, dialkyl magnesium, and metal borohydrides including those of the alkali metals, especially sodium, lithium and potassium, and of magnesium, beryllium and aluminum. The non-metal reducing agents include alkyl boranes such as triethyl borane, triisobutyl borane, and trimethyl borane and hydrides of boron such as diborane, pentaborane, hexaborane and decaborane.

For example, based upon a catalyst composition containing about 1% by weight of Cr based upon the weight of the support, the preferred amount of an organometallic reducing agent for use therewith, e.g., triisobutyl aluminum (TIBAL), is about 11.4% by weight and equivalent to an Al/Cr atomic ratio of about 3/1. The preferred range of atomic ratios of Al to Cr is from about 0.5/1 to about 8/1, or from about 1.9% to about 30% by weight TIBAL. The overall practicable limits of TIBAL in terms of the Al/Cr atomic ratio are from about 0.1/1 to 20/1, and in terms of weight are from about 0.4% to about 75% by weight.

The heat-treated, supported chromium containing compound and aluminum compound may be combined with the metallic or non-metallic reducing agent prior to being fed to an olefin polymerization reactor or these two components may be fed separately to an olefin polymerization reactor.

In proportioning the amount of metallic or nonmetallic reducing agent to the amount of chromium compound used in the catalyst systems of the present invention, fairly wide latitude is available, but some guidelines have been established consistent with good yield, favorable polymer properties and economic use of materials. For example, in the use of metallic and/or non-metallic reducing agents with an amount of chromium compound sufficient to yield about 1% Cr by weight of the support the parameters set forth below are representative. The atomic ratios are based upon a calculation of the metal in the metallic reducing agent and/or the nonmetal in the non-metallic reducing agent versus the chromium content present in the chromium compound on the support.

Another example of an organometallic reducing agent for use in conjunction with the catalyst composition of the present invention is triethyl aluminum. Again based upon a catalyst composition containing about 1% by weight of Cr based upon the weight of the support, the preferred amount of triethyl aluminum (TEA) is about 6.6% by weight based upon the weight of the support giving an Al/Cr atomic ratio of about 3/1. The preferred range of atomic ratios of Al to Cr is from about 0.5/1 to about 8/1, or from about 1.1% to about 18% by weight of TEA. The overall practicable limits of TEA, in terms of an Al/Cr ratio, are from about 0.1/1 to 20/1, and in terms of weight are from about 0.22% to about 44% by weight.

Triethyl boron (TEB) may be taken as the preferred example of the proporations of non-metallic reducing agent for use in conjunction with the catalyst composition of the present invention. Again based upon a catalyst composition containing about 1% by weight of Cr based upon the weight of the support, the preferred amount of TEB is about 5% by weight based upon the weight of the support giving a B/Cr atomic ratio of about 2.7/1. The preferred range of atomic ratios of B to Cr is from about 0.1/1 to 10/1, or from about 0.19 to about 19% TEB. The overall practicable limits, in terms of a B/Cr ratio, are from about 0.01/1 to about 20/1, and in terms of weight, are from about 0.02% to about 38% by weight based upon the weight of the support.

As indicated above, the preferred catalyst compositions of this invention are employed in conventional polymerization processes for olefins, in particular 1-olefins having 2–8 carbon atoms such as ethylene, propylene, 1-butene, 3-methylbutene-1, 4-methyl pentene-1 alone or in admixture, and copolymerization thereof with ethylenically unsaturated monomers such as vinyl acetate, acrylonitrile, or methyl methacrylate with or without modifiers, chain transfer or termination agents and the like, as known in the art. Such polymerizations may be effected under temperature and pressure conditions generally employed in the art e.g., temperatures of from about 40° to about 200° C. and preferably from about 70° to 110° C., and pressures of from 200 to 1000 psig and preferably from 300 to 800 psig, as are used in slurry or particle form polymerizations.

The catalyst of the invention appears to act uniquely in the polymerization of 1-olefins, especially where hydrogen is employed in the polymerization zone, in that the relation of molecular weight and molecular weight distribution responsive to hydrogen demand is modified. Thus, the excellent hydrogen response evident with the short chain e.g., dimer materials, permits wider latitude in hydrogen levels while maintaining acceptable productivity. In addition the shape of molecular weight distribution curves can be distinguished, with implications to shear response and die swell properties.

The following examples illustrate preferred modes of carrying out the preparation of the novel catalyst hereof, and of the use of such catalyst for the preparation of polyethylenes of modified and controlled rheological properties. It will be understood that the examples are illustrative only and that various modifications may be made in the specified parameters without departing from the scope of the invention.

Melt indices are determined in accordance with ASTM-D-1238, Conditions E(MI) and F(HLMI). Number average and weight average molecular weights are determined by gel permeation chromatography.

The following methods may be used to prepare the catalysts used in the invention referring, for purposes of exemplification only, to certain preferred embodiments:

PREPARATION OF POLYMERIC HYDROCARBON ALUMINATES

The polymeric hydrocarbon aluminates were prepared as disclosed in U.S. Pat. Nos. 3,054,816 and 3,056,725 incorporated herein by reference, utilizing the first stage of reaction only, and continuing reflux overnight. Solvent was removed by vacuum distillation to dryness.

In the case of the short chain or dimer material 1 mol of aluminum sec-butoxide is employed with 0.5 mol of water and the procedure of Example 2 of U.S. Pat. No. 3,056,725 employed with the foregoing modification. The product (1A) is isolated and determined to have an aluminum content of 13.9% consistently with theoretical aluminum of 14.8% for the following structural formula: $(H_9C_4O)_2Al$—$O$—$Al(OC_4H_9)_2$.

The long-chain material is prepared utilizing 1 mol of aluminum sec-butoxide to 1 mol of water, and the same procedure as for 1A. The product (1B) is isolated and determined to have an aluminum content of 19.7% compared to a theoretical aluminum content of 19.58% for the following structural formula:

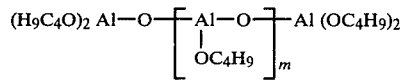

wherein m is 5–7, predominating in the hexamer.

The cyclic material is prepared in accordance with Example 1 of 3,054,816 modified as specified hereinabove utilizing 1 mol of aluminum isopropoxide to 0.9 mol of water. The product (1C) is isolated and determined to have an aluminum content of 23.85%, compared to theoretical aluminum of 26.4% for the following structural formula:

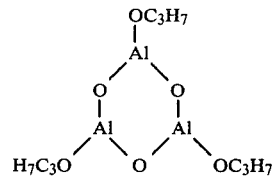

CATALYSTS

Silica gel (1.3% $H_2O$) having a surface area of about 300 $m^2/g$ and a nitrogen pore volume of about 2.5 cc/g is coated with the aluminum compound, and the chromium compound or other catalytic material. In the Examples, silica gel is coated (at about 1 wgt. percent Cr) with the reaction product of chromium trioxide and triethyl phosphate, as described in U.S. Pat. No. 3,984,351, incorporated herein by reference.

In the case of spray coating, the aluminum compound is diluted with one pore volume, (relative to silica gel) methylene chloride and sprayed onto the neat or chromium coated support at 90° F. over a period of one hour (during which 3 bed turnovers are accomplished). The coated catalyst is dried at 235° F. for two to six hours at 10–15 in. Hg, vacuum to remove volatiles. In a preferred modification of this procedure, the aluminum compound is slurried with two pore volumes of anhydrous methylene chloride, and the solvent removed by drying as aforesaid. Vapor coating may be achieved in similar manner by spraying the support, maintained at a temperature of 400° F., with the aluminum compound at 175° F. over a period of 1.5 hours, then raising the temperature for drying, to 500° F. maintained for 1 hour at maximum vacuum. In each case, the level of aluminum compound for purposes of exemplification is established at 3.7% by weight of Al (based upon the support).

The gel may also be simply slurried in a suitable anhydrous solvent such as methylene chloride with the aluminum compound and the chromium compound, and thereafter dried to remove volatiles. The dried catalyst may be blended with untreated silica gel, silica gel coated with chromium compound or other support material.

To heat activate the catalyst, the supported catalyst is fluidized with dry air at 0.20 feet per minute lineal velocity while being heated to a temperature of 900° C. and held at this temperature for 6 hours. The activated supported catalyst is recovered as a powder.

POLYMERIZATIONS

The thus formed catalysts are utilized in the pressurized production of polyethylene at a 210° F. synthesis temperature, with 0.5 cc triethylboron/g catalyst, at 10 mol percent ethylene, and with the proportion of hydrogen indicated.

EXAMPLE I

Silica gel having a pore volume of about 2.5 cc/g prepared in accordance with the disclosure in U.S. Pat. No. 3,652,215 is added to a 2000 ml, three-neck round bottom flask equipped with a stirrer, nitrogen inlet and y-tube with water condenser. A nitrogen atmosphere is maintained during the coating operation. Dichloromethane is then added to the flask containing the silica gel and stirring is commenced to insure uniform wetting of the gel. A dichloromethane solution of the reaction product of $CrO_3$ and triethyl phosphate prepared as described in U.S. Pat. No. 3,985,676, incorporated herein by reference, is then added to the flask in sufficient quantity to provide a dry coated catalyst containing about 1% by weight of Cr. The supernatant liquid is removed by filtration and the coated gel is dried in a rotary evaporator at 60° C. and with 29 inches of Hg vacuum.

Dichloromethane is added to a similar flask as prepared above and while maintaining a nitrogen atmosphere stirring is commenced. To the flask is added the supported chromium composition as prepared above. A solution of dichloromethane and polymeric hydrocarbon aluminate is prepared in a pressure equalizing dropping funnel and the funnel attached to the stirred flask. The polymeric aluminum compound solution is gradually added to the flask at the rate of 10 grams of solution per minute. After the addition of the solution is complete the slurry in the flask is stirred for about 1 hour. The supernatant liquid is removed by filtration and the coated gel is dried in a rotary evaporator at temperatures up to about 60° C. and 29 inches Hg vacuum.

The supported catalyst is placed in a cylindrical container and fluidized with dry air at 0.20 feet per minute lineal velocity while being heated to a temperature of 900° C. and held at this temperature for 6 hours. The activated supported catalyst is recovered as a powder.

The catalysts, coated at 3.7% Al on Polypor silica gel and heat activated were denominated 2A, 2B and 2C, respectively.

A series of polymerizations of ethylene are carried out with the results set forth in Table I, following, in which a selection of the resins were examined for molecular weight characteristics by gel permeation chromatography.

TABLE I-I

| Catalyst | Productivity (g PE/g cat) | $H_2$ (psig) | MI (Powder) | HLMI/MI |
|---|---|---|---|---|
| 2A (short chain) | 435 | 0 | 1.7 | 114 |
| | 675 | 30 | 9.8 | 75 |
| | 612 | 120 | 28 | 141 |
| 2B (long chain) | 905 | 0 | 0.7 | 88 |
| | 580 | 30 | 1.5 | 80 |
| | 273 | 120 | 2.3 | 120 |
| 2C (cyclic) | 336 | 0 | 1.4 | 99 |
| | 510 | 30 | 1.2 | 107 |
| | 649 | 120 | 1.4 | 76 |

TABLE I-II

| Catalyst | Productivity (g PE/g cat) | $H_2$ (psig) | MI (Powder) | HLMI/MI | $M_n \times 10^{-4}$ | $M_w \times 10^{-4}$ | $M_w/M_n$ |
|---|---|---|---|---|---|---|---|
| 2A (short chain) | 523 | 0 | 1.4 | 114 | 0.55 | 7.21 | 13.0 |
| | 525 | 30 | 12 | 75 | 0.59 | 5.62 | 9.5 |
| | 669 | 120 | 23 | 59 | 0.54 | 3.79 | 7.1 |
| 2B (long chain) | 850 | 0 | 0.8 | 84 | 0.91 | 8.47 | 9.4 |
| | 840 | 30 | 1.4 | 74 | 1.37 | 8.74 | 6.4 |
| | 442 | 120 | 1.8 | 94 | 0.78 | 7.04 | 9.0 |
| 2C (cyclic) | 604 | 0 | 1.4 | 99 | 0.89 | 7.51 | 8.5 |
| | 633 | 30 | 1.3 | 75 | 1.14 | 8.60 | 7.6 |
| | 580 | 120 | 1.8 | 82 | 1.02 | 7.40 | 7.2 |

The data reflects a trend toward higher melt indices for the short chain 2A type catalyst as compared to the longer chain 2B type. Molecular weight distribution analysis by gel permeation chromatography confirms the lower molecular weight buildup for the short chain type. Broader molecular weight distribution is seen for the cyclic type relative to the longer chain molecule. Hydrogen response is excellent for the short chain compound, and increasing hydrogen decreases the high molecular weight portion of the distribution.

EXAMPLE II

A series of additional polymerizations were conducted in the same manner utilizing catalysts prepared as in Example I varying hydrogen to ethylene mol ratio to secure resin of targeted melt index. Results are set forth in Table II, following.

TABLE II

| Catalyst | Melt Index | Density | $H_2$/C Ratio | $H_2$ | $M_n \times 10^{-4}$ | $M_w \times 10^{-4}$ | Ratio, Mn/Mw |
|---|---|---|---|---|---|---|---|
| 2A (Short chain) | 0.37 | 0.9494 | 0.77 | 3.22 | 1.36 | 9.18 | 6.7 |
| 2B (long chain) | 0.34 | 0.9525 | 1.46 | 4.90 | 1.25 | 8.63 | 6.9 |
| 2C | 0.36 | 0.9506 | 1.71 | 5.02 | 1.39 | 8.92 | 6.4 |

It will be noted that only half the hydrogen level was required for the short chain aluminum structure to obtain the target MI as compared to the two other structures.

What we claim is:

1. A process for the polymerization of olefins comprising reacting at least one olefin at from about 40° C. to about 200° C. and from 200 to 1000 psig in the presence of a catalytically effective amount of a heat activated catalyst comprising an inorganic support having surface hydroxyl groups, there being deposited upon the support (a) a chromium compound capable of reacting with the surface hydroxyl groups of the support and (b) a polymeric hydrocarbon aluminate essentially resistant to hydrolysis under preparative conditions for the catalyst and having at least one

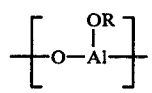

unit, wherein R is a hydrocarbyl radical having up to about 10 carbon atoms.

2. The process of claim 1 wherein the support is a silica xerogel having a surface area of 200 to 500 m²/g, a pore volume greater than about 2.0 cc/g, a major proportion of said pore volume being provided by pores having diameters in the range of 300 to 600 Å.

3. A process according to claim 1 wherein the inorganic support is a porous inorganic oxide support coated with an organophosphoryl chromium reaction product and a polymeric hydrocarbon aluminate and heat activated.

4. The polymerization process of claim 1, wherein said polymeric hydrocarbon aluminate is $(H_9C_4O)_2Al—O—Al(OC_4H_9)_2$.

5. The polymerization process of claim 1, wherein said polymeric hydrocarbon aluminate is

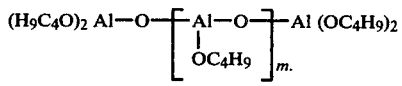

6. The polymerization process of claim 1, wherein said polymeric hydrocarbon aluminate is

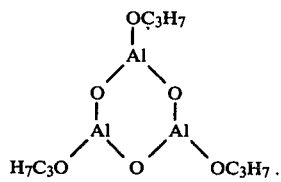

* * * * *